United States Patent
Yliaho (10) Patent No.: US 9,881,468 B2
(45) Date of Patent: Jan. 30, 2018

(54) AUDIO AND TACTILE SIGNAL GENERATION BY A DISPLAY APPARATUS

(75) Inventor: Marko Tapani Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/391,074

(22) PCT Filed: Apr. 19, 2012

(86) PCT No.: PCT/IB2012/051964
§ 371 (c)(1),
(2), (4) Date: Oct. 7, 2014

(87) PCT Pub. No.: WO2013/156819
PCT Pub. Date: Oct. 24, 2013

(65) Prior Publication Data
US 2015/0061846 A1    Mar. 5, 2015

(51) Int. Cl.
| | | |
|---|---|---|
| G08B 7/06 | (2006.01) | |
| H04N 21/8547 | (2011.01) | |
| G08B 7/00 | (2006.01) | |
| H04M 19/04 | (2006.01) | |
| G08B 7/02 | (2006.01) | |
| G06F 3/01 | (2006.01) | |
| G06F 3/16 | (2006.01) | |
| G06F 3/041 | (2006.01) | |

(Continued)

(52) U.S. Cl.
CPC ............... *G08B 7/06* (2013.01); *G06F 3/016* (2013.01); *G06F 3/041* (2013.01); *G06F 3/167* (2013.01); *G08B 3/10* (2013.01); *G08B 6/00* (2013.01); *G08B 7/00* (2013.01); *G08B 7/02* (2013.01); *H04M 19/047* (2013.01); *H04N 21/8547* (2013.01)

(58) Field of Classification Search
CPC .. G08B 7/00; G08B 7/02; G08B 6/00; H04M 19/047; H04N 21/8547
See application file for complete search history.

(56) References Cited

U.S. PATENT DOCUMENTS

| | | |
|---|---|---|
| 6,703,550 B2 | 3/2004 | Chu |
| 8,120,585 B2 | 2/2012 | Linjama et al. |

(Continued)

FOREIGN PATENT DOCUMENTS

| | | |
|---|---|---|
| EP | 1699217 | 9/2006 |
| JP | 2005229168 | 8/2005 |

OTHER PUBLICATIONS

Extended European Search Report received for corresponding European Patent Application No. 12874620.3, dated Dec. 18, 2015, 10 pages.

(Continued)

*Primary Examiner* — Andrew Bee
(74) *Attorney, Agent, or Firm* — Harrington & Smith (57) ABSTRACT

An apparatus comprising: a timing difference processor configured to determine a timing difference between an audio signal and an associated tactile signal, and further configured to delay at least one of the audio signal and associated tactile signal dependent on the timing difference; and at least one feedback processor configured to output the audio signal and associated tactile signal, at least one of the audio signal and associated tactile signal having been delayed dependent on the timing difference.

20 Claims, 6 Drawing Sheets

| | Audio feedback | Tactile feedback |
|---|---|---|
| Silent mode | Do not play | Play |
| Non-vibrate mode | Play | Do not play |
| Neither modes selected | Play | Play |
| Both modes selected | Do not play | Do not play |

(51) Int. Cl.
*G08B 3/10* (2006.01)
*G08B 6/00* (2006.01)

(56) References Cited

U.S. PATENT DOCUMENTS

| | | | |
|---|---|---|---|
| 2006/0066569 A1* | 3/2006 | Eid | G06F 3/016 |
| | | | 345/156 |
| 2006/0276225 A1* | 12/2006 | Suzuki | G08B 6/00 |
| | | | 455/557 |
| 2007/0236449 A1 | 10/2007 | Lacroix et al. | |
| 2008/0175420 A1 | 7/2008 | Chung et al. | |
| 2008/0287147 A1 | 11/2008 | Grant et al. | |
| 2009/0096632 A1 | 4/2009 | Ullrich et al. | |
| 2010/0141408 A1* | 6/2010 | Doy | G06F 3/016 |
| | | | 340/407.2 |
| 2010/0225600 A1 | 9/2010 | Dai et al. | |
| 2013/0207793 A1* | 8/2013 | Weaber | G06F 1/1601 |
| | | | 340/407.2 |
| 2014/0145836 A1 | 5/2014 | Tossavainen et al. | |

OTHER PUBLICATIONS

"Sound Settings", Android 2.2 User's Guide, May 1, 2010, pp. 319.
International Search Report and Written Opinion received for corresponding Patent Cooperation Treaty Application No. PCT/IB2012/051964, dated Feb. 13, 2013, 14 pages.
Chang et al., "Audio-Haptic Feedback in Mobile Phones", Extended Abstracts on Human Factors in Computing Systems, Apr. 2-7, 2005, pp. 1264-1267.

\* cited by examiner

|  | Audio feedback | Tactile feedback |
|---|---|---|
| Silent mode | Do not play | Play |
| Non-vibrate mode | Play | Do not play |
| Neither modes selected | Play | Play |
| Both modes selected | Do not play | Do not play |

FIG. 7

|  | Audio feedback | Tactile feedback |
|---|---|---|
| Nothing | Play using display | Play using display |
| Wired / wireless headphones | Play using headphones | Play using display |
| Wired / wireless speakers | Play using display | Play using display |
| TV out / HDMI / MHL | Play using display | Play using display |
| Wireless display | Play using display | Play using display |

FIG. 8

|  | Audio feedback | Tactile display feedback | Vibra feedback |
|---|---|---|---|
| Silent mode (S) | Do not play | This setting does not have effect | This setting does not have effect |
| Non-silent mode (NS) | Play | This setting does not have effect | This setting does not have effect |
| Vibra feedback (VE) | This setting does not have effect | This setting does not have effect | Play |
| Vibra feedback disabled (VD) | This setting does not have effect | This setting does not have effect | Do not play |
| Local feedback enabled (LE) | This setting does not have effect | Play | This setting does not have effect |
| Local feedback disabled (LD) | This setting does not have effect | Do not play | This setting does not have effect |

*FIG. 9*

AUDIO AND TACTILE SIGNAL GENERATION BY A DISPLAY APPARATUS

RELATED APPLICATION

This application was originally filed as PCT Application No. PCT/IB2012/051964 filed Apr. 19, 2012.

FIELD

The present invention relates to a display apparatus providing tactile and speaker functionality. The invention further relates to, but is not limited to, display apparatus providing tactile and speaker functionality for use in mobile devices.

BACKGROUND

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

Furthermore such devices typically also use electro-acoustic transducers to produce audio for earpiece and speaker operations as well as for alert tones. The moving coil dynamic speaker configuration used is typically relatively large in relation to the volume within the device and require specific signal processing considerations in order that the acoustic frequency response is acceptable. Furthermore moving coil transducers can attract contaminants such as small iron particles from within the internal volume of the device and also through ports provided to enable acoustic wave transmission from the speaker to the external environment. These contaminants can cause distortion and faults within the speakers significantly reducing the lifetime of the device.

STATEMENT

According to an aspect, there is provided a method comprising: determining a timing difference between an audio signal and an associated tactile signal; delaying at least one of the audio signal and associated tactile signal dependent on the timing difference; and determining outputting the audio signal and associated tactile signal, at least one of the audio signal and associated tactile signal having been delayed dependent on the timing difference.

The method may further comprise receiving at least one of: a combined audio signal and associated tactile signal; and a separate audio signal and associated tactile signal.

Receiving may comprise receiving the audio signal and associated tactile signal from at least one of: a memory; and an apparatus.

Determining outputting the audio signal and associated tactile signal may comprise determining the tactile output signal routing.

Determining the tactile output signal routing may comprise: determining a tactile mode of operation; and controlling the outputting of the tactile output signal dependent on the tactile mode of operation.

Determining the tactile output signal routing may comprise: determining a tactile output identifier; and controlling the outputting of the tactile output signal dependent on the tactile output identifier.

The tactile output identifier may be associated with at least one of: a local tactile output transducer; and a global tactile output transducer.

A tactile mode of operation may comprise a non-vibrate mode of operation, and wherein controlling the outputting of the tactile output signal dependent on the non-vibrate mode of operation comprises blocking the outputting of the tactile output signal.

Determining outputting the audio signal and associated tactile signal may comprise determining the audio output signal routing.

Determining the audio output signal routing may comprise: determining an audio mode of operation; and controlling the outputting of the audio output signal dependent on the audio mode of operation.

Determining the audio output signal routing may comprise: determining an audio output identifier; and controlling the outputting of the audio output signal dependent on the audio output identifier.

The audio output identifier may be associated with at least one of: an audio display output transducer; and an audio output transducer.

An audio mode of operation may comprise a silent mode of operation, and wherein controlling the outputting of the audio output signal dependent on the silent mode of operation may comprise blocking the outputting of the audio output signal.

Determining the audio output signal routing may comprise: determining an audio output component; and controlling the outputting of the audio output signal dependent on the audio output component.

The audio output component may comprise at least one of: an audio display; an audio transducer; an external speaker; a headphone set; a headset; an earpiece; and an external audio output.

According to a second aspect there is provided apparatus comprising at least one processor and at least one memory including computer code for one or more programs, the at least one memory and the computer code configured to with the at least one processor cause the apparatus to at least perform: determining a timing difference between an audio signal and an associated tactile signal; delaying at least one of the audio signal and associated tactile signal dependent on the timing difference; and determining outputting the audio signal and associated tactile signal, at least one of the audio signal and associated tactile signal having been delayed dependent on the timing difference.

The apparatus may be further caused to perform receiving at least one of: a combined audio signal and associated tactile signal; and a separate audio signal and associated tactile signal.

Receiving may cause the apparatus to perform receiving the audio signal and associated tactile signal from at least one of: a memory; and a further apparatus.

Determining outputting the audio signal and associated tactile signal may cause the apparatus to perform determining the tactile output signal routing.

Determining the tactile output signal routing may cause the apparatus to perform: determining a tactile mode of operation; and controlling the outputting of the tactile output signal dependent on the tactile mode of operation.

Determining the tactile output signal routing may cause the apparatus to perform: determining a tactile output identifier; and controlling the outputting of the tactile output signal dependent on the tactile output identifier.

The tactile output identifier may be associated with at least one of: a local tactile output transducer; and a global tactile output transducer.

A tactile mode of operation may comprise a non-vibrate mode of operation, and wherein controlling the outputting of the tactile output signal dependent on the non-vibrate mode of operation may causes the apparatus to perform blocking the outputting of the tactile output signal.

Determining outputting the audio signal and associated tactile signal comprises determining the audio output signal routing.

Determining the audio output signal routing may cause the apparatus to perform: determining an audio mode of operation; and controlling the outputting of the audio output signal dependent on the audio mode of operation.

Determining the audio output signal routing may cause the apparatus to perform: determining an audio output identifier; and controlling the outputting of the audio output signal dependent on the audio output identifier.

The audio output identifier may be associated with at least one of: an audio display output transducer; and an audio output transducer.

An audio mode of operation may comprise a silent mode of operation, and wherein controlling the outputting of the audio output signal dependent on the silent mode of operation may cause the apparatus to perform blocking the outputting of the audio output signal.

Determining the audio output signal routing may cause the apparatus to perform: determining an audio output component; and controlling the outputting of the audio output signal dependent on the audio output component.

The audio output component may comprise at least one of: an audio display; an audio transducer; an external speaker; a headphone set; a headset; an earpiece; and an external audio output.

According to third aspect there is provided an apparatus comprising: means for determining a timing difference between an audio signal and an associated tactile signal; means for delaying at least one of the audio signal and associated tactile signal dependent on the timing difference; and means for determining outputting the audio signal and associated tactile signal, at least one of the audio signal and associated tactile signal having been delayed dependent on the timing difference.

The apparatus may comprise means for receiving at least one of: a combined audio signal and associated tactile signal; and a separate audio signal and associated tactile signal.

The means for receiving may comprise means for receiving the audio signal and associated tactile signal from at least one of: a memory; and a further apparatus.

The means for determining outputting the audio signal and associated tactile signal may comprise means for determining the tactile output signal routing.

The means for determining the tactile output signal routing may comprise: means for determining a tactile mode of operation; and means for controlling the outputting of the tactile output signal dependent on the tactile mode of operation.

The means for determining the tactile output signal routing may comprise: means for determining a tactile output identifier; and means for controlling the outputting of the tactile output signal dependent on the tactile output identifier.

The tactile output identifier may be associated with at least one of: a local tactile output transducer; and a global tactile output transducer.

A tactile mode of operation may comprise a non-vibrate mode of operation, and wherein controlling the outputting of the tactile output signal dependent on the non-vibrate mode of operation may causes the apparatus to perform blocking the outputting of the tactile output signal.

The means for determining outputting the audio signal and associated tactile signal comprises means for determining the audio output signal routing.

The means for determining the audio output signal routing may comprise: means for determining an audio mode of operation; and means for controlling the outputting of the audio output signal dependent on the audio mode of operation.

The means for determining the audio output signal routing may comprise: means for determining an audio output identifier; and means for controlling the outputting of the audio output signal dependent on the audio output identifier.

The audio output identifier may be associated with at least one of: an audio display output transducer; and an audio output transducer.

An audio mode of operation may comprise a silent mode of operation, and wherein controlling the outputting of the audio output signal dependent on the silent mode of operation comprises the apparatus configured to block the outputting of the audio output signal.

The means for determining the audio output signal routing comprises: means for determining an audio output component; and means for controlling the outputting of the audio output signal dependent on the audio output component.

The audio output component may comprise at least one of: an audio display; an audio transducer; an external speaker; a headphone set; a headset; an earpiece; and an external audio output.

According to a fourth aspect there is provided an apparatus comprising: a timing difference processor configured to determine a timing difference between an audio signal and an associated tactile signal, and further configured to delay at least one of the audio signal and associated tactile signal dependent on the timing difference; and at least one feedback processor configured to output the audio signal and associated tactile signal, at least one of the audio signal and associated tactile signal having been delayed dependent on the timing difference.

The apparatus may comprise an input configured to receive at least one of: a combined audio signal and associated tactile signal; and a separate audio signal and associated tactile signal.

The input may be configured to receive the audio signal and associated tactile signal from at least one of: a memory; and a further apparatus.

The apparatus may further comprise a mode determiner configured to determine the tactile output signal routing.

The mode determiner may be configured to: determine a tactile mode of operation; and control the outputting of the tactile output signal dependent on the tactile mode of operation.

The mode determiner may comprise: a tactile mode analyser configured to determine a tactile output identifier; and a controller configured to control the outputting of the tactile output signal dependent on the tactile output identifier.

The tactile output identifier may be associated with at least one of: a local tactile output transducer; and a global tactile output transducer.

A tactile mode of operation may comprise a non-vibrate mode of operation, and wherein controlling the outputting of the tactile output signal dependent on the non-vibrate mode of operation may causes the apparatus to perform blocking the outputting of the tactile output signal.

The mode determiner may comprise an audio mode determiner configured to determine the audio output signal routing.

The audio mode determiner may be configured to: determine an audio mode of operation; and control the outputting of the audio output signal dependent on the audio mode of operation.

The audio mode determiner may comprise: an audio mode analyser configured to determine an audio output identifier; and an audio controller configured to control the outputting of the audio output signal dependent on the audio output identifier, The audio output identifier may be associated with at least one of: an audio display output transducer; and an audio output transducer.

An audio mode of operation may comprise a silent mode of operation, and wherein the audio controller may be configured to block the outputting of the audio output signal.

The audio mode determiner may comprise: an audio output determiner configured to determine an audio output component; and an audio controller configured to control the outputting of the audio output signal dependent on the audio output component.

The audio output component may comprise at least one of: an audio display; an audio transducer; an external speaker; a headphone set; a headset; an earpiece; and an external audio output.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs from a touch screen device.

Figure 1:
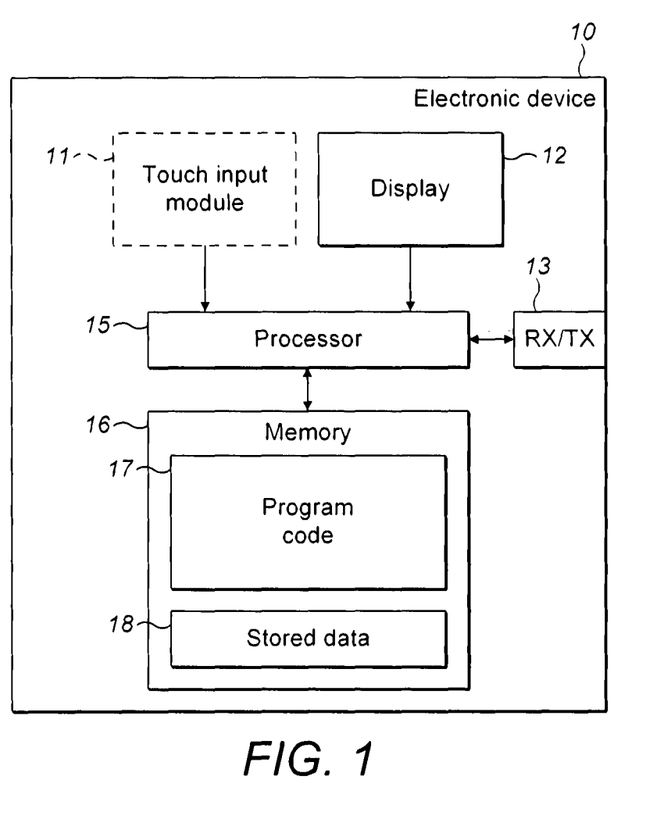
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. An example of such a touch sensor can be a touch sensitive user interface to replace keypads in automatic teller machines (ATM) that does not require a screen mounted underneath the front window projecting a display. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch capture digital processing or configuration code where the touch input module inputs are detected and processed, pseudo-audio signal generation and processing where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window. As described herein the display 12 in some embodiments can be implemented as a physical fixed display. For example the display can be a physical decal or transfer on the front window. In some other embodiments the display can be located on a physically different level from the rest of the surface, such a raised or recessed marking on the front window. In some other embodiments the display can be a printed layer illuminated by a light guide under the front window.

In some embodiments, the apparatus comprises an orientation sensor. The orientation sensor can be any suitable orientation sensor. The orientation sensor can in some embodiments be part of a position sensor configured to estimate the position of the apparatus. The position sensor can in some embodiments be a satellite positioning sensor such as GPS (Global Positioning System), GLONASS or Galileo receiver.

In some embodiments, the positioning sensor can be a cellular ID system or assisted GPS system.

In some embodiments, the orientation sensor can be any suitable orientation sensor. For example, in some embodiments the orientation sensor can be an electronic compass, an accelerometer, a gyroscope or be determined by the motion of the apparatus using the positioning estimate (in other words, dead reckoning).

Figure 2:
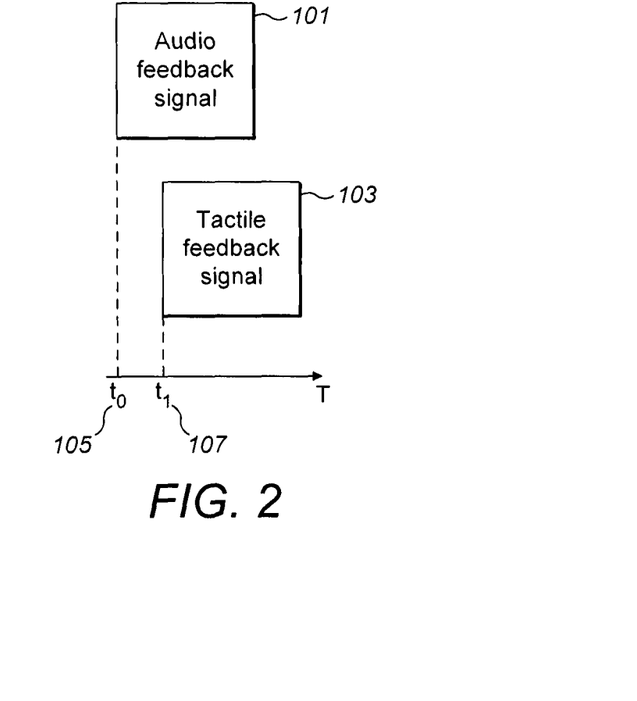
FIGS. 2 and 3 show schematically example audio feedback signal and tactile audio feedback components.

With respect to FIG. 2 a schematic view of example separate audio feedback signal and tactile feedback signal is shown. In the example shown in FIG. 2 the audio feedback signal 101 component starts at time instance $t_0$ 105 and the tactile feedback signal 103 component starts at time instance $t_1$ 107. In other words there may be a time delay defined by $t_1-t_0$ between the separate audio feedback signals and tactile feedback signals.

Figure 3:
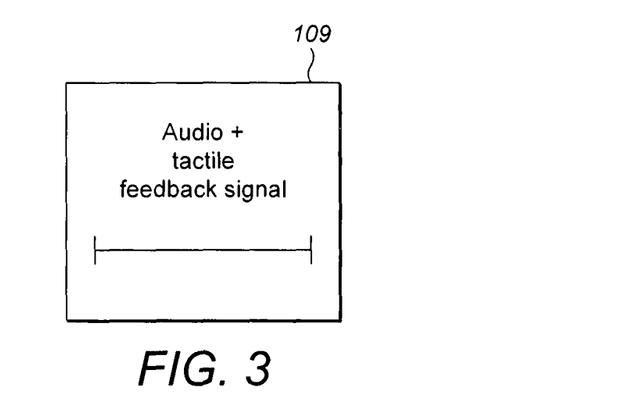

Furthermore with respect to FIG. 3 a schematic view of example combined audio feedback signal and tactile feedback signal is shown. In the example shown in FIG. 3 the combined audio and tactile feedback signal 109, can in some embodiments have an implicit audio component and feedback component delay.

As described herein the audio feedback signal and tactile feedback signal are processed locally within an apparatus comprising an audio display as described herein. The apparatus can in some embodiments retrieve the audio feedback signal and tactile feedback signal from a memory, or in some embodiments the apparatus may receive the audio feedback signal and tactile feedback signal from a further apparatus.

The audio feedback signal can be any suitable signal source. For example the audio signal can be a microphone input (recording a concert or a telephone conversation).

In some embodiments the tactile feedback signal can be a suitable electrical signal representing a 'pseudo-audio' signal which when output reproduces a tactile output representing a touch or tactile input.

Figure 4:
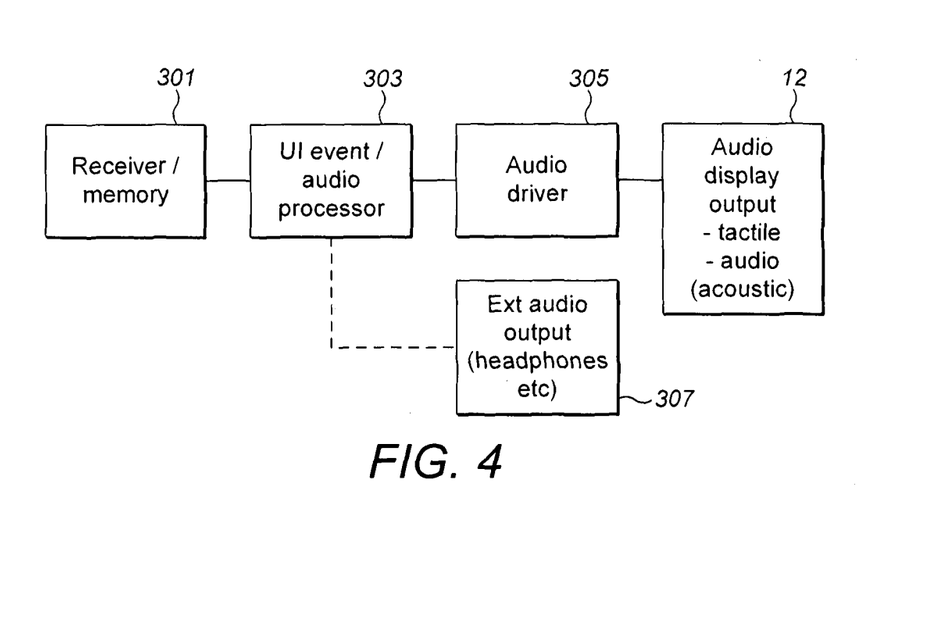
FIG. 4 shows schematically a tactile user output apparatus according to some embodiments.
Figure 5:
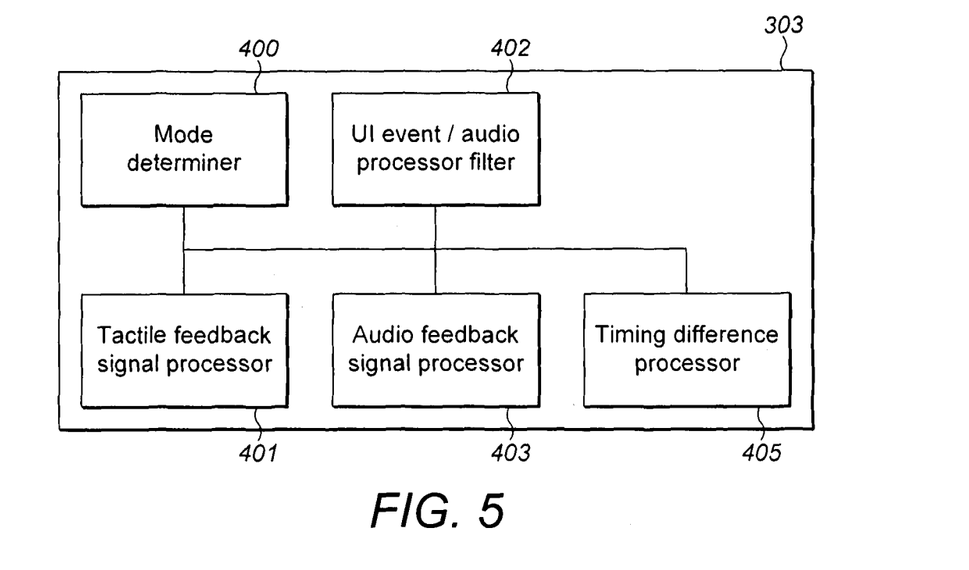
FIG. 5 shows schematically the UI event/audio processor as shown in FIG. 4 in further detail according to some embodiments.

With respect to FIGS. 4 and 5 an example of a tactile user output apparatus according to some embodiments is shown. Furthermore with respect to FIG. 6 the operation of the tactile user output apparatus as shown in FIGS. 4 and 5 is shown. In the example described herein the audio feedback signal and tactile feedback signal is a combined audio feedback and tactile feedback signal however it would be understood that in some other embodiments the audio feedback signal and tactile feedback signal are separate but associated signals.

In some embodiments the tactile user output apparatus comprises a receiver/memory 301. The receiver/memory 301 is configured to receive or retrieve a transmitted encoded audio and tactile feedback signal. The receiver/memory 301 can be any suitable receiver such as for example a wireless communications receiver or suitable receiver means. Similarly the receiver/memory 301 can be any suitable memory means.

In some embodiments the output of the receiver 301 can be passed to the UI event/audio processor 303.

Figure 6:
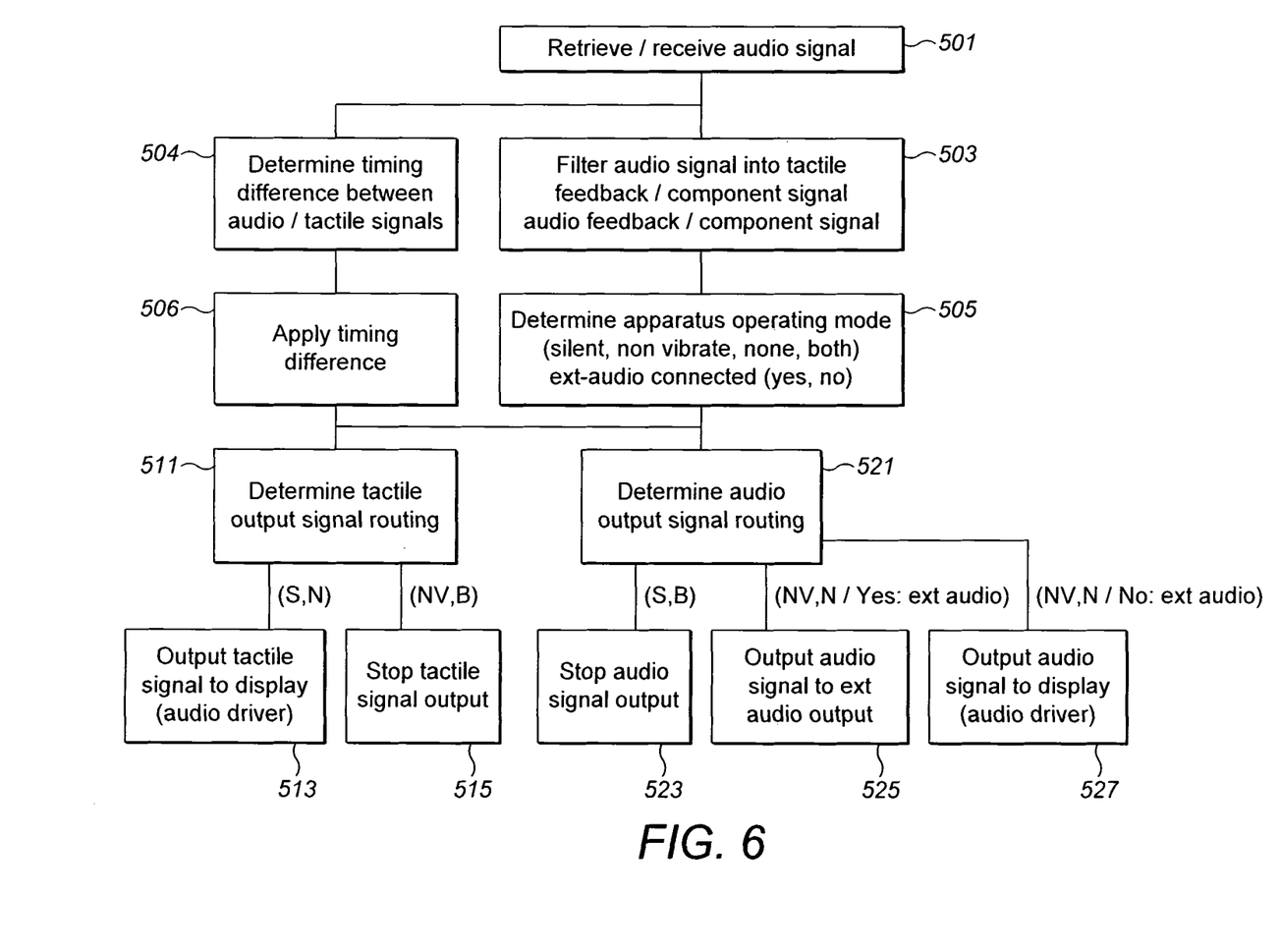
FIG. 6 shows a flow-diagram of the operation of the tactile user output apparatus as shown in FIGS. 4 and 5 according to some embodiments.

The operation of receiving/retrieving the combined audio and tactile feedback signal is shown in FIG. 6 by step 501.

The tactile user output apparatus in some embodiments comprises a UI event/audio processor 303. The UI event/audio processor 303 is configured to receive the received encoded combined audio signal from the receiver/memory 301, and route and control the routing of the audio feedback signal and tactile feedback signal. With respect to FIG. 5 the user interface event/audio processor 303 is shown in further detail. In other words the concept of the application is based about receiving feedback signals. In some embodiments at least one type of which being a tactile feedback signal. In some embodiments at least one type of which is an audio feedback signal and at least another type of which is a tactile feedback signal. In such embodiments the feedback signals are processed such that the audio and tactile components are processed effectively dependent on the time delay (where present) between the signals and the mode of operation of the apparatus at the time. In the following example in order to aid understanding of the implementation embodiments there are two feedback signals, an audio feedback signal and a tactile feedback signal however it would be understood that in some embodiments the user interface event/audio processor 303 can be configured to receive/retrieve and number of signals. For example user interface event/audio processor 303 can be configured to receive X audio signals and Y tactile/haptic signals.

The use of multiple audio signals and tactile signals can be because the apparatus can comprise multiple displays each able to accept an independent signal.

Furthermore in some embodiments, for each display, there can be more than one associated tactile feedback transducer, for example a number of local (display transducer) and global (vibra transducer) feedback transducers.

It would be understood that in some embodiments where there is more than one feedback signal there can in some embodiments be associated with each feedback signal an address indicator or identifier configured to indicate from which output the feedback is to be played from. In such embodiments the user interface event/audio processor 303 can be configured to process the indicator or identifier to route the signal to the correct addressed location.

Although in the following example there are shown two signals with an offset, in some embodiments the user interface event/audio processor 303 can be configured to process time offset values for each of the signals.

The combined audio signal can in some embodiments be passed to a user interface event/audio processor filter 402 and to a timing difference processor 405.

The user interface event/audio processor 303 can in some embodiments comprise a user interface event/audio processor filter 402. The filter 402 can be any suitable filter configured to separate the combined audio signal into an audio feedback component signal and a tactile feedback component signal. In some embodiments the filter 402 can therefore be implemented as a low-pass/high-pass filter or band-pass filter configured to separate the tactile frequencies (implemented as pseudo-audio frequencies of a specific frequency range) from the audio frequencies of the combined audio signal. The audio component signal can in some embodiments be passed to an audio feedback signal processor 403. The tactile component signal can in some embodiments be passed to a tactile feedback signal processor 401.

The operation of filtering the combined audio signal into audio feedback component signals and tactile feedback components signals is shown in FIG. 6 by step 503.

In some embodiments where there are separate audio feedback signal and tactile feedback signal components it would be understood that the apparatus can pass the components directly to the mode determiner and the user interface event/audio processor filter 402 is not required and can be optional.

In some embodiments the user interface event/audio processor 303 comprises a mode determiner 400. The mode determiner 400 can be configured to determine operating characteristics of the apparatus receiving the combined audio signal. For example in some embodiments the mode determiner can be configured to determine whether the apparatus is operating within a silent (S) mode, a non-vibration (NV) mode, both silent and non-vibrate (B) mode or neither silent and non-vibrate (N). It would be understood that in some embodiments there can be more modes of operation or operating characteristics, however in the examples described herein the modes are silent (S) mode, a non-vibration (NV) mode, both silent and non-vibrate (B) mode or neither silent and non-vibrate (N).

Furthermore in some embodiments the mode determiner 400 can be configured to determine whether the apparatus is coupled to an external audio output (Yes:ExtAudio or No:ExtAudio). Examples of external audio outputs can for example be external audio devices where rendering is performed in the external device, in other words no decoding is performed in the apparatus. For example the apparatus can use DLNA (digital living network alliance) protocols or Wi-Fi external displays. For example in some embodiments the mode determiner 400 can be configured to determine whether a physical (such as a 3.5 mm audio plug), or wireless (such as a bluetooth connection) coupling has been between the apparatus and an external audio output and in some embodiments what type external audio output the output is. For example the output could be headphones, headset, an external speaker, a TV speaker or monitor with audio speakers. In some embodiments the external audio connection determination or check can be performed where the audio signal is filtered and where the audio and tactile feedback signals are together.

The operation of determining the operating mode of the apparatus is shown in FIG. 6 by step 505.

In some embodiments the UI event/audio processor 303 comprises a timing difference processor 405. The timing difference processor 405 is configured to determine whether there is any timing difference between the audio and tactile signals. Where there is a difference between the timing of the audio and tactile signals then the timing difference processor is configured to delay one of the tactile or audio signal components prior to output.

The operation of determining the timing difference between the tactile signal and the audio signal is shown in FIG. 6 by step 504.

The operation of delaying one of the tactile signal or audio signal dependent on the timing difference determination is shown in FIG. 6 by step 506.

In some embodiments the user interface event/audio processor 303 comprises a tactile feedback signal processor 401. The tactile feedback signal processor can in some embodiments be configured to receive the tactile component signal from the filter 402 and further be configured to receive indicators from the mode determiner 400.

The tactile feedback signal processor 401 can then be configured to determine where to output the tactile signal.

The determination of where to route the tactile signal is shown in FIG. 6 by step 511.

In some embodiments the tactile signal processor 401 can be configured to output the tactile feedback signal to the audio display when receiving the mode determination indicators that the current mode of operation of the apparatus is a silent (S) or neither silent or non-vibration (N) mode.

The operation of outputting the tactile signal to the display (via the audio driver) when the current mode of operation of the apparatus is a non-vibrate (NV) or both silent and non-vibration (B) mode is shown in FIG. 6 by step 513.

Furthermore the tactile feedback signal processor 401 can be configured to hold or stop the output of the tactile signal when receiving the mode determination indicators that the current mode of operation of the apparatus is a non-vibrate (NV) or both silent and non-vibration (B) mode.

The operation of stopping or halting outputting the tactile signal to the display (via the audio driver) when the current mode of operation of the apparatus is a non-vibrate (NV) or both silent and non-vibration (B) mode is shown in FIG. 6 by step 515.

In some embodiments the user interface event/audio processor 303 comprises an audio feedback signal processor 403. The audio feedback signal processor 403 is configured to receive the audio signal from the filter 402 and further receive indicators from the mode determiner 400 indicating which mode operation the apparatus is in and furthermore whether there is any external audio connection or coupling.

The operation of determining where to route the audio signal is shown in FIG. 6 by step 521.

In some embodiments the audio signal processor 403 can be configured to output the audio feedback signal to the audio display when receiving the mode determination indicators that the current mode of operation of the apparatus is a non-vibrate (NV) or neither silent and non-vibration (N) mode and that there is no suitable external audio output (No:ExtAudio).

The operation of outputting the audio signal to the display (via the audio driver) when the current mode of operation of the apparatus is a non-vibrate (NV) or neither silent and non-vibration (N) mode and that there is no suitable external audio output (No:ExtAudio) is shown in FIG. 6 by step 527.

In some embodiments the audio signal processor 403 can be configured to output the audio feedback signal to the external audio output when receiving the mode determination indicators that the current mode of operation of the apparatus is a non-vibrate (NV) or neither silent and non-vibration (N) mode and that there is a suitable external audio output (Yes:ExtAudio).

The operation of outputting the audio signal to the external audio output when the current mode of operation of the apparatus is a non-vibrate (NV) or neither silent and non-vibration (N) mode and that there is a suitable external audio output (Yes:ExtAudio) is shown in FIG. 6 by step 525.

Furthermore the audio feedback signal processor 403 can be configured to hold or stop the output of the audio signal when receiving the mode determination indicators that the current mode of operation of the apparatus is a silent (S) or both silent and non-vibration (B) mode. In such embodiments the indicator whether there is a suitable external audio output is not used.

The operation of stopping or halting outputting the audio signal to the display (via the audio driver) when that the current mode of operation of the apparatus is a silent (S) or both silent and non-vibration (B) mode is shown in FIG. 6 by step 523.

Figure 7:
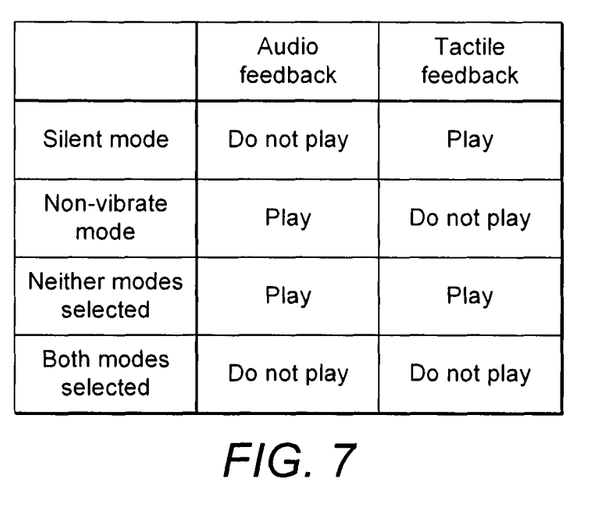
FIG. 7 shows a table of example routing of audio/tactile outputs according to the mode of the apparatus according to some embodiments.
Figure 8:
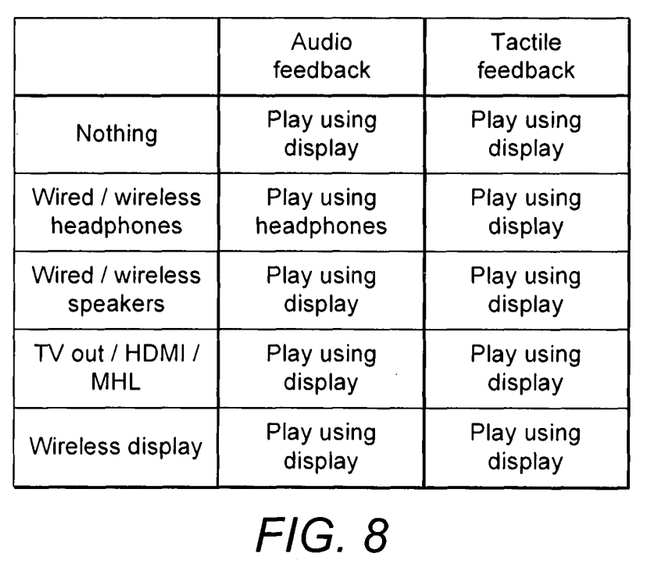
FIG. 8 shows table of example routing of audio/tactile outputs dependent on the output destination according to some embodiments.
Figure 9:
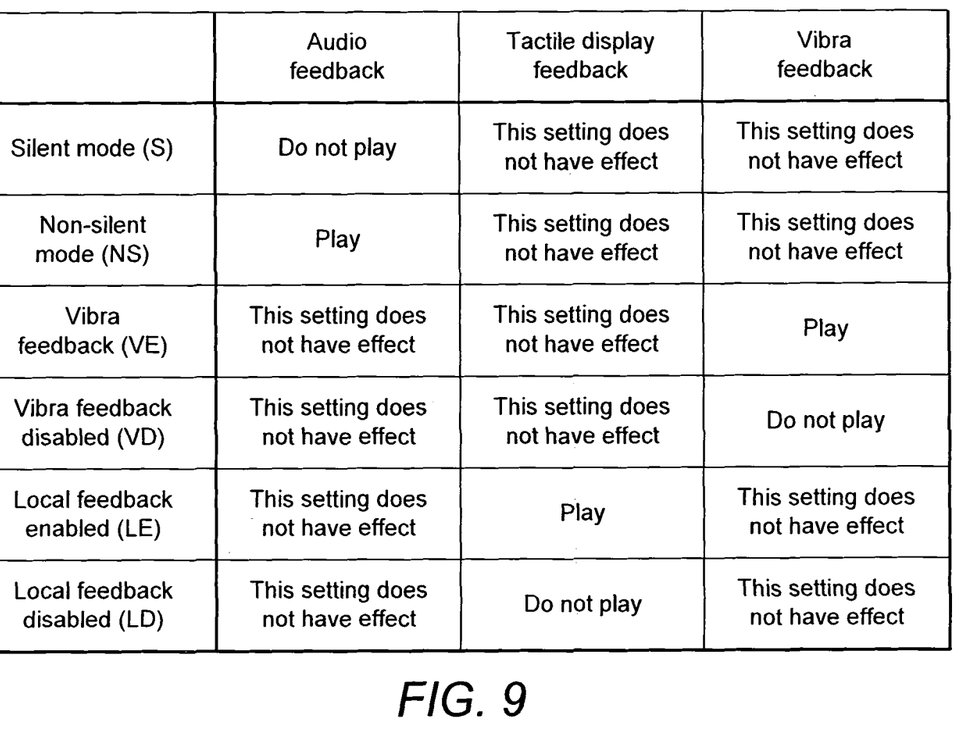
FIG. 9 shows a further table of example routing of audio/tactile outputs where the tactile outputs can be divided into tactile display and vibra feedback dependent on the output destination according to some embodiments.

With respect to FIGS. 7, 8 and 9 tables showing examples of the processing of audio and tactile feedback signals are shown with respect to the mode of operation of the apparatus (FIG. 7), furthermore the external audio output (FIG. 8), and separate local (tactile display) feedback and global (vibra) feedback on audio and tactile signals.

Thus as shown in FIG. 7 for a silent mode of operation the audio feedback signal is not played whereas the tactile feedback signal is played (on the display). The non-vibrate mode causes the apparatus to play the audio feedback signal but not to play the tactile feedback signal. When neither of the silent or non-vibrate modes are selected then the audio feedback signal is played and the tactile feedback signal is played. However when both silent and non-vibrate modes are selected then the audio signal is not played and the tactile signal is not played.

Furthermore with respect to FIG. 8 where there is no external audio output detected then the audio feedback signal and tactile feedback signal are played using the display. When a wired or wireless headphones external audio device is detected then the audio feedback signal is played using the headphones, whereas the tactile feedback is played using the display. When a wired or wireless speaker audio output is detected then the audio feedback is played using the display and the tactile feedback is played using the display also.

When a TV output (or HDMI or MHL output) is detected then the audio feedback is played using the display and the tactile feedback is played using the display.

When a wireless display is detected then the audio feedback is played using the display and the tactile feedback signal is played using the display.

In some embodiments where the tactile feedback is split into tactile display feedback and vibra feedback then the table, such as shown in FIGS. 7 and 8 is expanded as shown in FIG. 9 to allow the separate settings for vibra feedback and tactile display feedback within the user interface of the apparatus.

In some embodiments, as shown in FIG. 4 by the dashed line, the tactile user output apparatus can comprise an external audio output 307 such as headphones, headsets, earpieces, external speakers etc. The external audio output 307 can be coupled to the user interface event/audio processor 303 such that when detected or determined by the mode determiner 400. In such embodiments as described herein the audio feedback signal processor 403 can be configured to output the audio to the external audio output rather than the audio driver.

The decoder in some embodiments can pass the decoded combined audio signal to an audio driver 305.

In some embodiments the tactile user output apparatus comprises an audio driver 305 configured to receive the decoded combined audio signal. The audio driver 305 is configured to process the combined audio signal in such a way that it drives the audio transducers coupled to the display.

In some embodiments the tactile user output apparatus comprises the audio display 12. The audio display 12, can in some embodiments be the touch display as described herein configured to receive the combined audio signal drive signal and based on this signal to generate not only an acoustic waves (typically with a frequency greater than 300 Hz) but also is configured to generate tactile waves using the audio display (typically using audio signals below 300 Hz).

The coupling or communications medium or network between the transmitter and receiver can be any suitable medium. As described herein the network could in some embodiments be any suitable circuit switched, packet switched or hybrid network. For example in some embodiments the transmitter and receiver are cellular or mobile network transmitter and receivers communicating over a circuit switched network. Similarly the transmitter and receiver are packet switched wireless communications network elements. In some embodiments the communication can be over Bluetooth or other suitable short distance wireless link.

Similarly in some embodiments the transmitter and receiver are wired network components, for example a circuit switched communications system such as the POTS circuit switched network, a packet switched network such as a voice over Internet protocol (VoIP) communications or any suitable combination or hybrid communications system.

In some embodiments the transmitter and receiver elements can be replaced by memory storage means. For example the encoded combined audio signal is stored on a memory which can in some embodiments be replaceable or fixed to the apparatus, and at a later time the encoded combined audio signal is played to produce an audio and tactile event. Thus in some embodiments while recording an audio event with the apparatus the user can tap the screen to create a physical reminder which can be output as a tactile output when the audio event is replayed.

In some embodiments the apparatus can be used during two party telephony, when the one party uses the touch screen the touch event is coded to the audio signal and mixed to the uplink signal of the phone call. The second party with the receiver, having a tactile audio display device, can feel the touch feedback on their device by holding their hand on the display. In such a way the transmitter can send a physical event to the receiver of the call.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analogue and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   determining an audio signal and a tactile signal from a combined signal, wherein the combined signal links the audio signal and the tactile signal, the combined signal comprising the tactile signal to be generated from a touch display and the audio signal to be generated based on an audio transducer actuating the touch display for the audio signal generation while the tactile signal is being generated, wherein the combined signal is output in a first operating mode of an apparatus comprising the audio transducer coupled to the touch display;

determining a second operating mode in use, wherein the second operating mode is one of a plurality of operating modes of the apparatus and the second operating mode is different from the first operating mode; and separating the combined signal into the audio signal and the tactile signal according to the second operating mode to be independently processed such that for the second operating mode the tactile signal is output from the touch display while the audio signal is not output based on the audio transducer actuating the touch display.

2. The method as claimed in claim 1, further comprising storing the audio signal and the associated tactile signal with a timing difference therebetween in a memory.

3. The method as claimed in claim 1, wherein the independent processing comprises determining routing for the tactile signal that is output from the touch display.

4. The method as claimed in claim 3, wherein determining the routing for the tactile signal comprises:
controlling the outputting of the tactile signal dependent on the second operating mode.

5. The method as claimed in claim 4, wherein determining the second operating mode is based on a user interface of the apparatus, and wherein the second operating mode comprises a silent mode of operation such that the audio signal is not being output.

6. The method as claimed in claim 3, wherein determining the routing for the tactile signal comprises:
determining a tactile output identifier; and
controlling the outputting of the tactile signal dependent on the tactile output identifier.

7. The method as claimed in claim 6, wherein the tactile output identifier is associated with at least one of:
a local tactile output transducer;
a global tactile output transducer; and
the audio transducer.

8. The method as claimed in claim 1, wherein the independent processing comprises determining routing for the audio signal in the second mode.

9. The method as claimed in claim 8, wherein determining the routing for the audio signal comprises:
blocking the outputting of the audio signal generation from the touch display dependent on the second operating mode.

10. The method as claimed in claim 1, further comprising:
determining a third operating mode in use by the apparatus such that the tactile signal is not output from the touch display while in the third operating mode.

11. The method as claimed in claim 9, wherein determining the routing for the audio signal comprises:
determining an audio output component; and
blocking the outputting of the audio signal generation from the determined audio output component based on a request from a user interface of the apparatus.

12. The method as claimed in claim 11, wherein the audio output component comprises at least one of:
another audio transducer;
an external speaker;
a headphone set;
a headset;
an earpiece; and
an external audio output.

13. The method as claimed in claim 8, wherein determining the routing for the audio signal comprises:
determining an audio output identifier that indicates the audio signal is to be output based on a different audio transducer in the second mode; and blocking the outputting of the audio signal generation from the touch display dependent on the audio output identifier.

14. The method as claimed in claim 1, wherein separating the combined signal into the audio signal and the tactile signal is based on at least one of:
the audio signal and the tactile signal being linked by the combined signal based on a time delay between the audio signal and the tactile signal, wherein the audio signal of the combined signal is separated, at least partially, from the tactile signal of the combined signal; and
a filter applied to the combined signal, wherein the audio signal is linked to the tactile signal such that the audio signal is separable from the tactile signal based on the filter.

15. An apparatus comprising:
a touch display,
at least one processor, and
at least one memory including computer code for one or more programs, the at least one memory and the computer code configured to, with the at least one processor, cause the apparatus to at least:
determine an audio signal and a tactile signal from a combined signal, wherein the combined signal links the audio signal and the tactile signal, the combined signal comprising the tactile signal to be generated from the touch display and the audio signal to be generated based on an audio transducer actuating the touch display for the audio signal generation while the tactile signal is being generated, wherein the combined signal is output in a first operating mode of an apparatus comprising the audio transducer coupled to the touch display;
determine a second operating mode in use, wherein the second operating mode is one of a plurality of operating modes of the apparatus and the second operating mode is different from the first operating mode; and
separate the combined signal into the audio signal and the tactile signal according to the second operating mode to be independently processed such that for the second operating mode the tactile signal is output from the touch display while the audio signal is not output based on the audio transducer actuating the touch display.

16. The apparatus as claimed in claim 15, wherein the independent processing comprises determining routing for the tactile signal that is output from the touch display.

17. The apparatus as claimed in claim 16, wherein determining the routing for the tactile signal comprises:
controlling the output of the tactile signal dependent on the second operating mode.

18. The apparatus as claimed in claim 16, wherein determining the routing for the tactile signal comprises:
determining a tactile output identifier; and
controlling the output of the tactile signal dependent on the tactile output identifier.

19. The apparatus as claimed in claim 15, wherein separation of the combined signal into the audio signal and the tactile signal is based on at least one of:
the audio signal and the tactile signal being linked by the combined signal based on a time delay between the audio signal and the tactile signal, wherein the audio signal of the combined signal is separated, at least partially, from the tactile signal of the combined signal; and a filter applied to the combined signal, wherein the audio signal is linked to the tactile signal such that the audio signal is separable from the tactile signal based on the filter.

20. A memory storing program code that when executed by one or more processors causes a host device to perform:
determining an audio signal and a tactile signal from a combined signal, wherein the combined signal links the audio signal and the tactile signal, the combined signal comprising the tactile signal to be generated from a touch display and the audio signal to be generated based on an audio transducer actuating the touch display for the audio signal generation while the tactile signal is being generated, wherein the combined signal is output in a first operating mode of the host device comprising the audio transducer coupled to the touch display;
  determining a second operating mode in use, wherein the second operating mode is one of a plurality of operating modes of the host device and the second operating mode is different from the first operating mode; and
  separating the combined signal into the audio signal and the tactile signal according to the second operating mode to be independently processed such that for the second operating mode the tactile signal is output from the touch display while the audio signal is not output based on the audio transducer actuating the touch display.

* * * * *